(12) United States Patent  
Chang

(10) Patent No.: US 9,494,974 B2
(45) Date of Patent: Nov. 15, 2016

(54) TOUCH DISPLAY DEVICE

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 195 days.

(21) Appl. No.: 14/469,589

(22) Filed: Aug. 27, 2014

(65) Prior Publication Data

US 2015/0062037 A1 Mar. 5, 2015

(30) Foreign Application Priority Data

Aug. 30, 2013 (TW) .............................. 102131191 A

(51) Int. Cl.
*G09G 5/00* (2006.01)
*G06F 1/16* (2006.01)

(52) U.S. Cl.
CPC ............ *G06F 1/1626* (2013.01); *G06F 1/1647* (2013.01); *G06F 1/1654* (2013.01); *G06F 2200/1633* (2013.01); *G06F 2200/1634* (2013.01)

(58) Field of Classification Search
None
See application file for complete search history.

(56) References Cited

U.S. PATENT DOCUMENTS

| 6,535,199 | B1* | 3/2003 | Canova, Jr. | G06F 1/1626 345/156 |
| 7,289,083 | B1* | 10/2007 | Canova, Jr. | G06F 1/1622 345/1.1 |
| 8,760,405 | B2* | 6/2014 | Nam | G06F 1/1616 345/168 |
| 2013/0176237 | A1* | 7/2013 | Chu | G06F 3/1431 345/173 |

* cited by examiner

*Primary Examiner* — Adam R Giesy
(74) *Attorney, Agent, or Firm* — Zhigang Ma

(57) ABSTRACT

A touch display device includes a touch display panel, a first processor, an auxiliary display panel, and a second processor. The touch display panel is a liquid crystal display. The first processor connects to the touch display panel. The first processor generates image signals according to touch signals sensed by the touch display panel and outputs the image signals to the touch display panel. The touch display panel displays images according to the image signals. The auxiliary display panel is an Electro-Phoretic Display. The second processor connects to the auxiliary display panel and the first processor. The second processor receives the image signals from the first processor, and controls the auxiliary display panel to display the images displaying on the touch display panel.

8 Claims, 4 Drawing Sheets

TOUCH DISPLAY DEVICE

BACKGROUND

1. Technical Field

The present disclosure relates to display devices, and particularly to a touch display device.

2. Description of Related Art

Display devices, such as mobile phones, generally use a light emitting diode (LED) display screens or organic light emitting diode (OLED) display screens to display images. When the mobile phone is used in the environment with high light intensity, the user might not be able to view the images of the display screen clearly, causing inconvenience when operating the mobile phone.

Therefore, it is desirable to provide a touch display device to overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
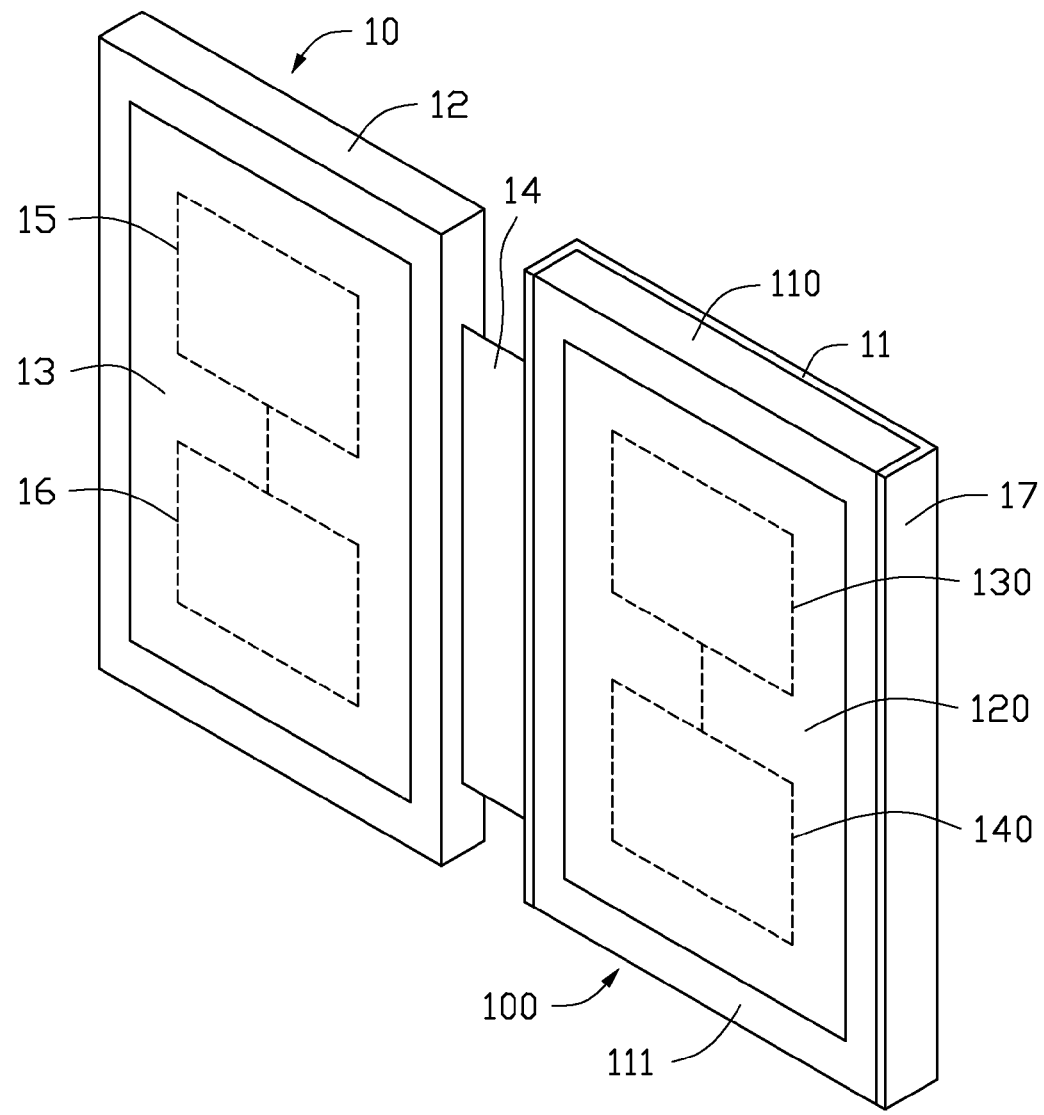
FIG. 1 is a schematic, isometric view of a touch display device in accordance with a first exemplary embodiment.
Figure 2:
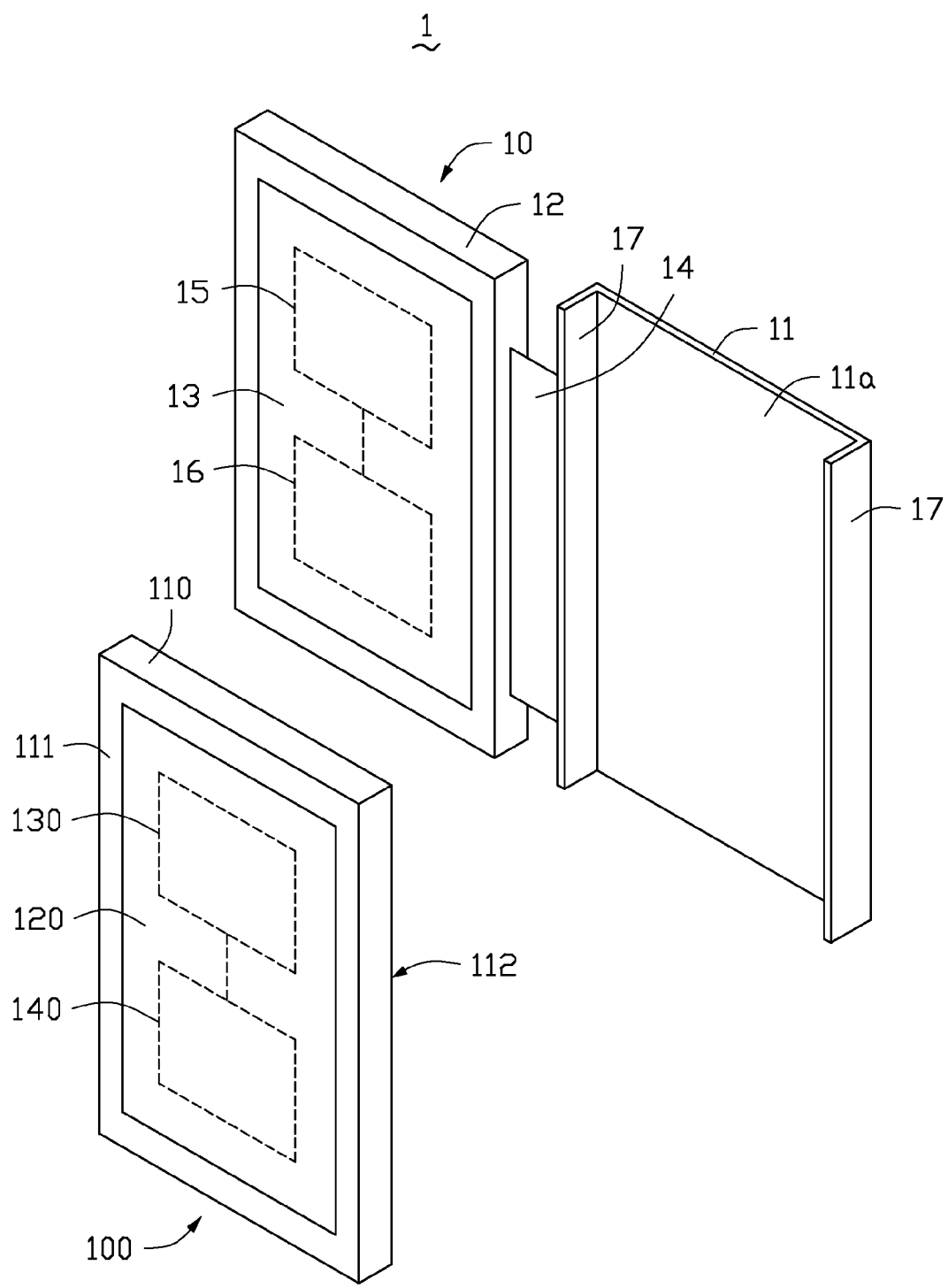
FIG. 2 is an exploded view of the touch display device of FIG. 1.

FIGS. 1-2 show a touch display device 1 according to a first exemplary embodiment. The touch display device 1 includes an auxiliary display module 10 and a touch display module 100. In this embodiment, the touch display module 100 is a mobile phone.

The touch display module 100 includes a first casing 110, a touch display panel 120 and a first processor 130. The touch display panel 120 and the first processor 130 are received in the first casing 110. The first casing 110 includes a first surface 111 and a second surface 112 opposite to the first surface 111. The touch display panel 120 is positioned on the first surface 111, generally adjacent to a center of the first surface 111. The touch display panel 120 includes a display screen (not shown) and a touch panel (not shown) embedded in the display screen. In this embodiment, the display screen of the touch display panel 120 is an LCD display screen. The first processor 130 generates image signals according to touch signals sensed by the touch display panel 120 and outputs the image signals to the touch display panel 120. The touch display panel 120 displays images according to the image signals.

The auxiliary display module 10 includes a protective cover 11, a second casing 12, an auxiliary display panel 13, a connecting element 14 and a second processor 15. The protective cover 11 defines a receiving groove 11a, and the receiving groove 11a penetrates two opposite shorter sides of the protective cover 11, thus the other two opposite longer sides form two barrier walls 17. The touch display module 100 is received in the receiving groove 11a, and is clamped between the two barrier walls 17. The first surface 111 of the touch display module 100 is exposed from the receiving groove 11a. The protective cover 11 is connected with the second casing 12 by the connecting element 14.

The auxiliary display panel 13 and the second processor 15 are received in the second casing 12. The auxiliary display panel 13 is an Electro-Phoretic Display (EPD). When the auxiliary display module 10 is not folded on the touch display module 100, the auxiliary display panel 13 is turned on. When the auxiliary display module 10 is folded on the touch display module 100, the auxiliary display panel 13 is turned off. A size of the second casing 12 is equal to a size of the first casing 110. A size of the auxiliary display panel 13 is equal to a size of the touch display panel 120. The second processor 15 is used for receiving the image signal from the first processor 130, and controls the auxiliary display panel 13 to display the images, which are the same as the images displayed on the touch display panel 120.

The auxiliary display module 10 connects with the touch display module 100 via a wireless or a wired connection. In this embodiment, a first communication equipment 140 and a second communication equipment 16 are respectively received in the first casing 110 and the second casing 12. The first communication equipment 140 is electrically connected to the first processor 130, and the second communication equipment 16 is electrically connected to the second processor 15. The first communication equipment 140 and the second communication equipment 16 are both Near Field Communication (NFC) devices. The first processor 130 transmits the image signals from the first communication equipment 140 and the second communication equipment 16 to the second processor 15.

In some embodiments, the first casing 110 and the second casing 12 respectively have a first connector (not shown) and a second connector (not shown). The first connector electrically connects to the first processor 130 and the second connector electrically connects to the second processor 15. The first connector is coupled with the second connector. The first processor 130 transmits the image signals from the first connector and the second connector to the second processor 15.

In use, the touch display panel 120 and the auxiliary display panel 13 display the same images. When a user can clearly view the images displayed on the touch display panel 120 under the light intensity of the current environment, the user can acquire image information from the touch display panel 120 or the auxiliary display panel 13. When the light intensity of the current environment is too high to view the images displayed on the touch display panel 120, the user can acquire image information from the auxiliary display panel 13.

In detail, the auxiliary display panel 13 generates a cursor under control of the second processor 15. When the user slides on the touch display panel 120, the touch display panel 120 generates a touch signal. The second processor 15 receives the touch signal from the first processor 130, and the cursor moves in the auxiliary display panel 13 under control of the second processor 15. Therefore, the user can operate the touch display device 1 in the environment with high light intensity.

Figure 3:
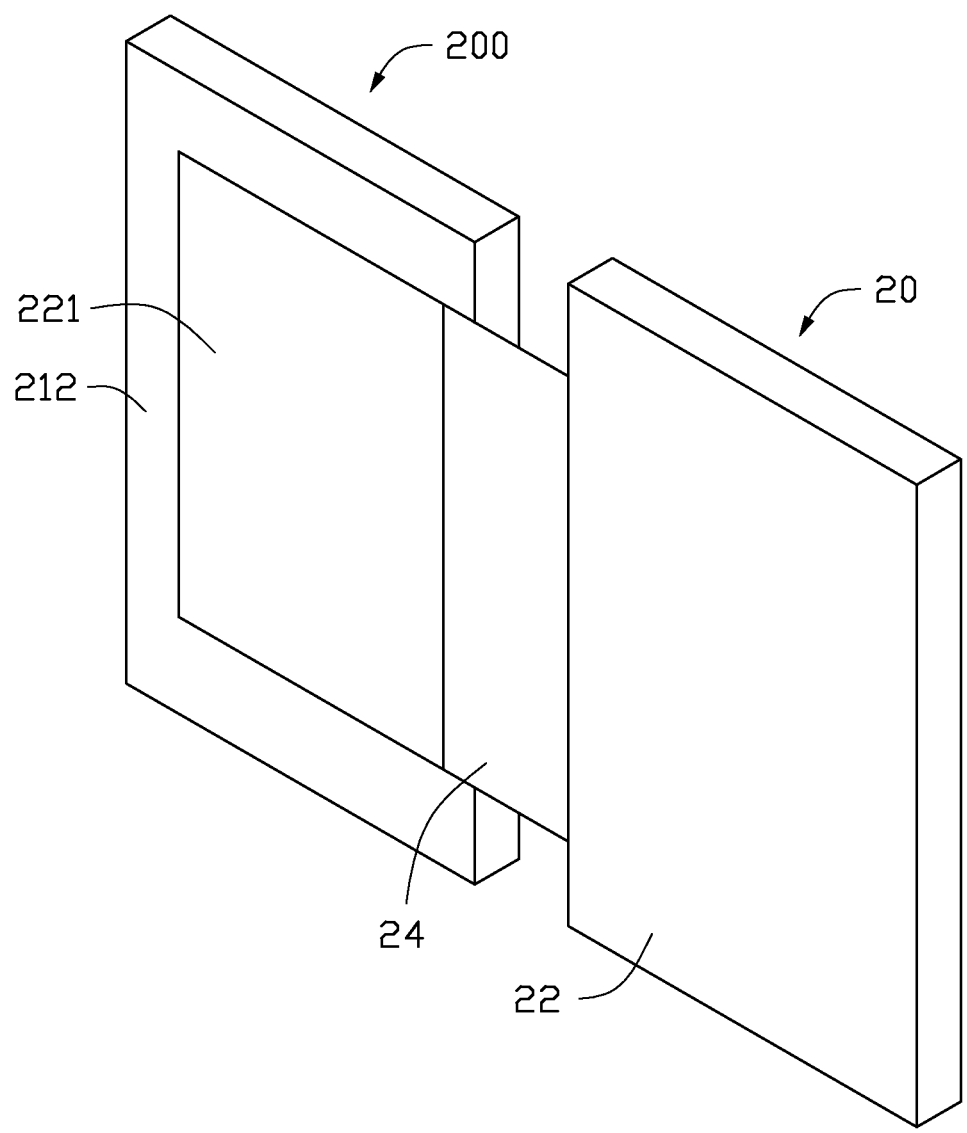
FIG. 3 is a schematic, isometric view of a touch display device in accordance with a second exemplary embodiment.
Figure 4:
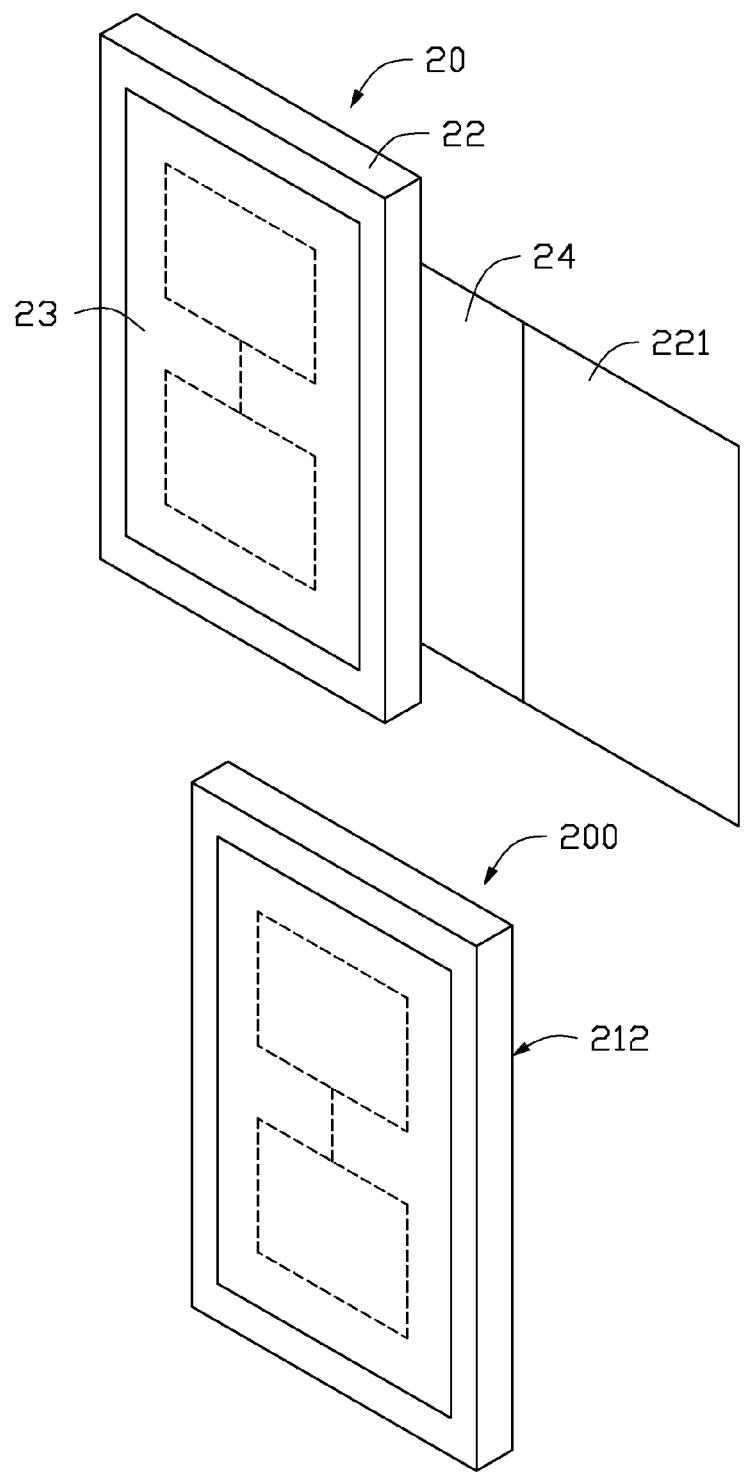
FIG. 4 is an exploded view of the touch display device of FIG. 3.

FIGS. 3-4 show a touch display device 200 according to a second exemplary embodiment. The difference between the touch display module 200 and the touch display module 100 is that the touch display module 200 further includes a detachable battery (not shown). The difference between the auxiliary display module 20 in the second embodiment and the auxiliary display module 10 in the first embodiment is that, the auxiliary display module 20 includes a rear cover 221, a second casing 22, and an auxiliary display panel 23, and a connecting element 24. The rear cover 221 is detachably positioned on the second surface 212, and is used for covering the detachable battery of the touch display module 200. The rear cover 221 is connected with the second casing 22 via the connecting element 24.

As the touch display device includes the touch display panel 120 and the auxiliary display panel 13, and when the touch display device 1 is used in the environment with high light intensity, the user can clearly view images from the touch display panel 120 or the auxiliary display panel 13.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A touch display device, comprising:
   a touch display panel, the touch display panel being a liquid crystal display;
   a first processor electrically connecting to the touch display panel; the first processor generating image signals according to touch signals sensed by the touch display panel and outputting the image signals to the touch display panel, the touch display panel displaying images according to the image signals;
   an auxiliary display panel, the auxiliary display panel being an Electro-Phoretic Display; and
   a second processor electrically connecting to the auxiliary display panel and the first processor;
   the second processor receiving the image signals from the first processor, and controlling the auxiliary display panel to display the images displaying on the touch display panel;
   wherein when a light intensity of a current environment is greater than a preset intensity, the auxiliary display panel generates a cursor under control of the second processor, the touch display panel generates touch signals in response to touch input on the touch display panel, the second processor receives the touch signals from the first processor to control the cursor to move in the auxiliary display panel.

2. The touch display device of claim 1, further comprising a first casing and a second casing, wherein the touch display panel and the first processor are received in the first casing, and the auxiliary display panel and the second processor are received in the second casing.

3. The touch display device of claim 2, further comprising a protective cover and a connecting element, wherein the protective cover is connected with the second casing by the connecting element.

4. The touch display device of claim 3, wherein the protective cover defines a receiving groove, and the touch display panel is received in the receiving groove.

5. The touch display device of claim 4, wherein the receiving groove penetrates two opposite shorter sides of the protective cover, the other two opposite longer sides form two barrier walls, the touch display panel is clamped between the two barrier walls.

6. The touch display device of claim 2, further comprising a rear cover and a connecting element, wherein the rear cover is positioned on the second casing, and the rear cover is connected with the second casing by the connecting element.

7. The touch display device of claim 1, further comprising a first communication equipment and a second communication equipment, wherein the first communication equipment is electrically connected to the first processor, the second communication equipment is electrically connected to the second processor, the first processor transmits the image signals from the first communication equipment and the second communication equipment to the second processor.

8. The touch display device of claim 7, wherein the first communication equipment and the second communication equipment are both Near Field Communication devices.

* * * * *